Jan. 16, 1940.   R. P. KOEHRING   2,187,086
METALLIC ELEMENT AND METHOD OF MAKING SAME
Filed Feb. 10, 1938
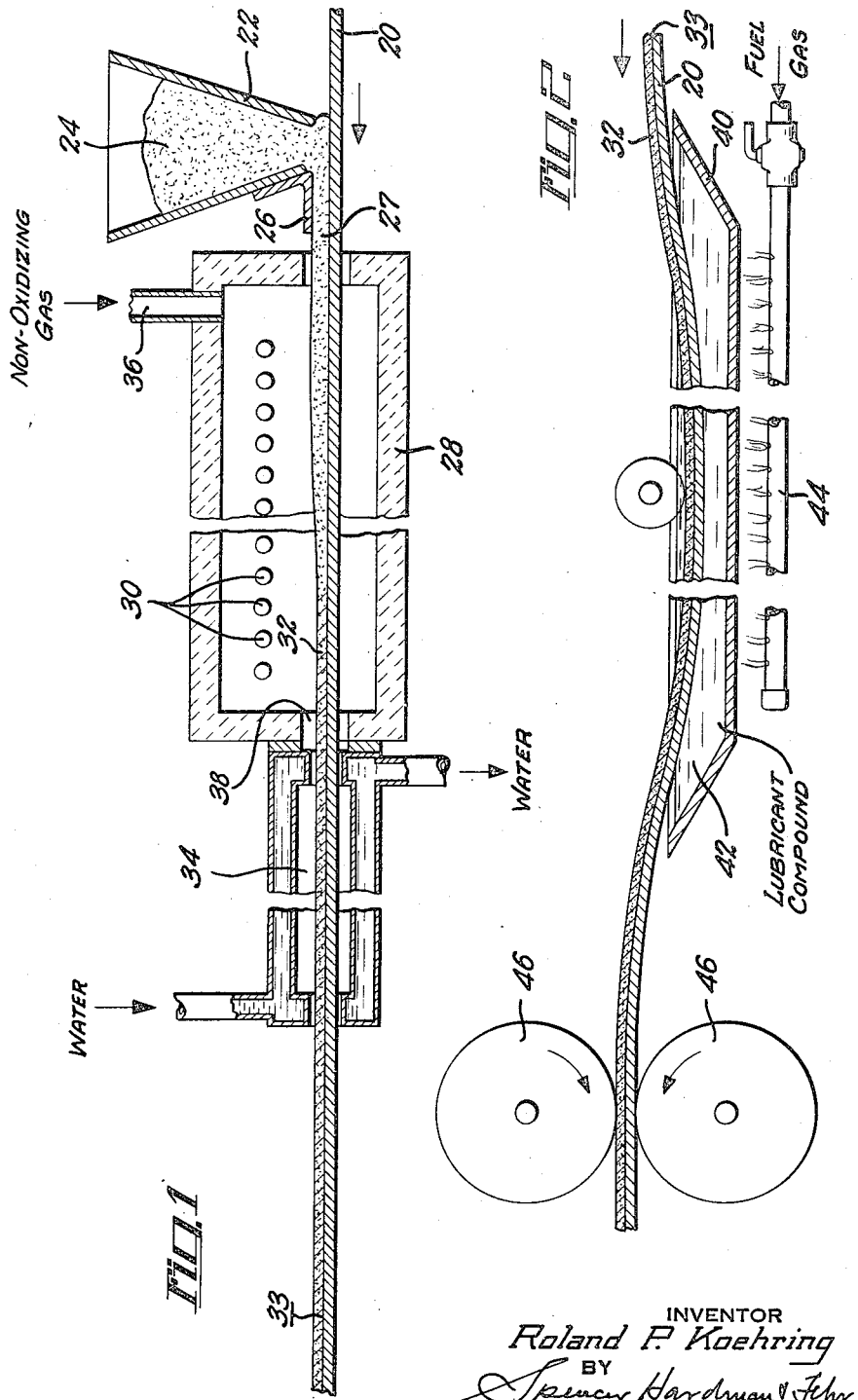
INVENTOR
Roland P. Koehring
BY
Spencer Hardman & Fehr
his ATTORNEYS Patented Jan. 16, 1940

2,187,086

UNITED STATES PATENT OFFICE 2,187,086

METALLIC ELEMENT AND METHOD OF MAKING SAME

Roland P. Koehring, Dayton, Ohio, assignor to General Motors Corporation, Detroit, Mich., a corporation of Delaware Application February 10, 1938, Serial No. 189,739

14 Claims. (Cl. 29—149.5)

The invention relates to porous metal elements and is particularly concerned with porous metal elements that are impregnated with a suitable lubricant material and to the method of making the same.

One of the objects of the present invention is to provide a sintered porous metal element which has a completely sponge-like physical structure, comprising minute intercommunicating pores therein, said pores being substantially completely filled with a solid lubricant material, such as a graphitic material.

Another object of the invention is to provide a sintered porous metal element having a completely sponge-like physical structure, comprising minute intercommunicating pores therein, said pores mechanically holding and being substantially completely filled with a solid lubricant material so as to provide a lubricated surface on the element approximating the character of the lubricant.

It is a further object of the invention to provide a composite metal element which includes a sintered porous metal layer of sponge-like physical structure, comprising minute intercommunicating pores therethrough, which layer is bonded by an alloy bond to a layer of non-porous metallic material, said pores within the porous metal layer mechanically holding and substantially filled with a solid lubricant material.

In carrying out the above invention it is a further object to utilize a porous metal layer comprising bronze, Monel metal, iron alloys, aluminum alloys, etc.

Another object of the invention is to provide a method for forming a porous metal element having the pores thereof substantially filled with a solid lubricant material, including the steps of distributing a uniform layer of uncompacted metal powder upon a supporting surface, sintering the metal powder layer under suitable conditions to form a strong highly porous metal layer, and subsequently impregnating the porous metal layer with a solid lubricant material.

In carrying out the above object it is a further object, in some cases, to compact the porous metal layer after impregnation thereof and thereby reduce the size of the surface entries of the pores to assist in retaining the lubricant therein.

In carrying out the two preceding objects, it is a still further object, in some cases, to distribute the metal powder layer, prior to sintering thereof, upon a non-porous metallic back, such as steel, and then sintering the composite structure to cause the powdered metal layer to sinter together and to be simultaneously bonded by an alloy bond to the non-porous metallic back.

Further objects and advantages of the present invention will be apparent from the following description, reference being had to the accompanying drawing wherein preferred embodiments of the present invention are clearly shown.

In the drawing:

Fig. 1 is a diagrammatic view illustrating one method of applying a loose uncompacted layer of metal powder upon a non-porous metal back, and then sintering the loose layer of metal powder, in situ upon the metal back, to form a highly porous metal lining, or layer, bonded directly to the metal back, and Fig. 2 is a diagrammatic view illustrating one method of impregnating a porous metal layer with a lubricant material such as graphite, the drawing showing the porous metal layer bonded to a non-porous metal back.

Porous metal articles such as are fabricated by sintering together briquetted powdered metals are well-known in the art and have been in successful use for many years. One of the most common uses of porous metal articles is in the fabrication of bearing elements. Such porous metal bearing elements are usually impregnated with oil prior to their disposition in the machine in which they are to be used, and this impregnated oil slowly exudes at the bearing surface, due to capillarity within the intercommunicating pores of the porous metal bearing, and thereby lubricates the bearing surface. Oil impregnated porous metal bearings come under the nomenclature of self-lubricating bearings. It is the usual practice in bearing installations of the type described to provide an external oil reservoir around the porous metal bearing and to fill the same with oil which is gradually absorbed by the porous metal bearing to replenish the oil supply therein as capillary attraction within the pores of the bearing causes an exudation of oil at the bearing surface. Porous metal bearings used in connection with slow moving reciprocating, or rotating, parts usually contain sufficient oil therein to provide adequate lubrication for long periods of time without the use of such an external reservoir.

One of the later developments in the art of making porous metal bearings is a reinforced porous metal bearing in which the porous metal comprises only a thin layer directly bonded to a non-porous supporting back, such a back usually being steel. The porous metal layer is formed in situ upon the back by distributing uncompacted metal powders upon the supporting back, and then sintering the loose metal powders to form a strong, highly porous metal structure which is directly bonded by an alloy bond to the metal back. The porous metal layer in this latter type of bearing has a considerably higher degree of porosity than the porous metal in the usual type of unsupported bearing. This may be explained by the fact that the usual type of porous metal bearing is formed by sintering briquetted, or compressed, metal powders, rather than loose powders as are utilized in the supported type of bearings.

Supported porous metal bearings are more economical to manufacture since only a thin layer of powdered metal is applied to the steel back. Furthermore, such bearings have greater mechanical strength than an unsupported type of bearing since the steel back has a greater mechanical strength than the porous metal material.

One difficulty which arises with the heretofore described supported type of bearing is the greatly reduced oil carrying volume therein, which prevents self-lubrication over any appreciable period of time. Then too, the steel supporting back presents difficulties when an external oil reservoir is to be used.

The present invention is directed to self-lubricated porous metal bearing of the supported back type and to a method of fabricating such bearings, wherein a solid lubricant is retained within the bearing.

Referring to the drawing, Fig. 1 is a diagrammatic representation of one method of applying a porous metal bearing layer to a non-porous metal back. 20 represents a strip of steel, or other non-porous metal, which passes beneath a hopper 22 that is filled with suitable powdered metal 24. The powdered metal 24 drops through the hopper 22, with the aid of gravity, upon the surface of the strip 20. A suitable leveling device 26 smooths the powdered metal layer to a substantially uniform depth and aids in distributing the powdered metal completely across the strip of steel. The steel strip 20 with the powdered metal layer 27 thereon then passes into a sintering furnace 28 which is preferably heated by electric heating elements 30 that are thermostatically controlled to give the desired temperatures within the furnace. The powdered metal layer 27, upon being heated, sinters together to form a strong highly porous layer which is directly bonded to the steel strip 20 thereby forming a composite structure 33. As indicated on the drawing, the powdered metal layer 27 shrinks upon sintering thereof to from ½ to ⅓ its original depth and the porous metal layer 32 is therefore of less depth upon emerging from the furnace than was the powdered metal layer 27 upon entering the furnace. The proper depth of powdered metal to be used is best determined by trial.

The strip 20 with the porous metal layer 32 bonded thereto emerges from furnace 28 and passes directly into a water cooled chamber 34, whence it emerges into the atmosphere of the room. In order to prevent oxidation of the powdered metal during sintering thereof a non-oxidizing or reducing atmosphere is supplied to the furnace 28 through the inlet 36. This atmosphere is supplied at a pressure greater than atmospheric pressure and therefore leaks out of the exit 38 of the water cooled chamber 34, thus substantially preventing the ingress of oxidizing atmospheric gases, while simultaneously providing a substantially non-reactive atmosphere within the sintering furnace 28.

Any desired powdered metal may be used in forming the powdered metal layer and includes copper and tin, when a bronze layer is desired, copper and nickel, when a Monel layer is desired, copper and iron, copper and aluminum or in fact any combination of alloying metals which will form a suitable bearing layer of a highly porous nature. Specific combinations are well-known in the art and suffice to say that in each instance it is preferable to sinter at a temperature of above the melting point of the lowest melting metal and below the melting point of the highest melting metal and maintain such a temperature for approximately one half an hour. A specific example in the formation of a bronze layer is to sinter the copper-tin mixture of desired proportions at a temperature approximating 1600° F. for one half hour, which temperature is above the melting point of tin (449° F.) and below the melting point of copper (1981° F.).

Prior to the distribution of the powdered metal layer upon the strip 20, it is preferable to plate the bonding surface of the strip 20, for example, with a copper, lead or tin plate. Such a plated surface aids in the bonding of the porous metal layer to the steel strip. It should be understood however, that a satisfactory bond can be obtained without such plating, the use thereof merely facilitating a more rapid bonding action.

It is preferable that the porous structure of the porous metal layer is of a coarse nature to facilitate subsequent impregnation. However, if the structure is not coarse, impregnation can be accomplished by the use of colloidal or otherwise finely divided graphite.

After the porous metal layer is formed in situ upon the non-porous metal supporting back, the composite strip 33 may be impregnated by any well known method. One of such methods is shown in Fig. 2, wherein 40 represents an impregnating vat which is substantially filled with a lubricating compound 42, a gas burner 44 being provided for maintaining the compound in fluid state. Such a compound may be graphite in combination with a bituminous binder, such as coal tar, pitch or asphalt, or the graphite may be suspended in molten resin or in molten compound of the phenolformaldehyde condensation product type. Likewise paraffine, beeswax or carnauba wax, etc. may be used as a vehicle of the graphite. Any of the aforementioned graphitic compounds have a melting point considerably above room temperature and therefore the compounds are solid at ordinary operating temperatures. The heat from burner 44 causes the compound to become liquid, in which state it readily flows into the pores of the porous metal layer 32 by capillarity as the composite strip 33 is passed therethrough. Upon emergence from the vat 42, the composite strip 33 carrying the graphitic compound therein is preferably passed between pressure rolls 46 which compact the porous metal layer to a slight extent, by mushrooming the metal peaks on the porous metal surface, thereby reducing the size of the entries of the pores to the surface. In this manner the lubricant is mechanically held within the pores. Obviously this compacting step is not entirely necessary since the internal configuration of the pores is not uniform and due to the intercommunicating character thereof, the impregnated compound is retained therein. However, the rolling step aids in the retention of the impregnated lubricant as well as causing the surface of the bearing to be smooth and uniform. The composite impregnated strip 33 may next be cut into suitable lengths and formed into the desired shape depending upon the contemplated use thereof.

While the foregoing description has been directed to a porous metal layer bonded to a non-porous metal strip, or a supporting back, it is apparent that metal powders may also be loosely distributed on a supporting back which has substantially no bonding affinity therefor, such as a graphite sheet, or plate. In this instance after the porous metal layer has been sintered it may be lifted off the supporting plate since the sintered porous metal layer is self-supporting, and may be subsequently impregnated as previously described. The impregnated porous metal layer or sheet may then be applied to a suitable non-porous support by mechanical means, if desired.

In the embodiments heretofore described the impregnated graphite composition solidifies within the pores of the porous metal upon cooling and forms a lubricating film over the metal, when the same is used as a bearing, the entire film having similar characteristics to the lubricating compound used. Bearings impregnated with graphitic lubricants are lubricated for the life of the bearings since as the bearing metal wears away new surfaces of graphitic compound are exposed.

The improved bearings are more efficient in use than the usual type of rolled bronze bearings carrying graphite in dimples or grooves at the bearing surface, since in this latter type of bearing the graphite is easily displaced by pounding of the bearings due to heavy loads imposed thereon and also as the bearing wears, the area of graphite is usually reduced and in some cases the graphitic lubricant is entirely exhausted. In the improved type of porous metal bearing the graphite is substantially uniformly dispersed throughout the entire porous metal layer of the bearing and substantially fills all of the intercommunicating pores of the porous metal layer. Thus, regardless of the degree of wear on the bearing substantially the same relative areas of graphite and metal are present at the bearing surface at all times. Similarly, due to the sponge-like structure of the material the graphite is locked in place and cannot be displaced.

While the embodiments of the present invention as herein disclosed, constitute preferred forms, it is to be understood that other forms might be adopted, all coming within the scope of the claims which follow.

What is claimed is as follows:

1. A sintered porous metal element having a completely sponge-like physical structure, said element being made from non-compacted metal powder and comprising minute intercommunicating pores therein, and bodies of a solid lubricant mechanically held within said pores and substantially completely filling the same.

2. A sintered porous metal element having a completely sponge-like physical structure, said element being made from non-compacted metal powder and comprising minute intercommunicating pores therein, and a solid lubricant mechanically held within said pores and substantially completely filling the same for providing a lubricated surface on the element approximating the character of the lubricant.

3. A sintered porous metal bearing element having a completely sponge-like physical structure, said element being made from non-compacted metal powder and comprising minute intercommunicating pores therein, and bodies of a graphitic lubricant material mechanically held within said pores and substantially completely filling the same.

4. A composite metal element including a sintered porous layer of sponge-like physical structure, said element being made from non-compacted metal powder and comprising minute intercommunicating pores therethrough, a non-porous metallic supporting back bonded to said layer by an alloy bond, and bodies of a solid lubricant material substantially completely filling the pores of the porous metal layer and mechanically held therein.

5. A sintered porous bronze element having a completely sponge-like physical structure, said element being made from non-compacted metal powder and comprising minute intercommunicating pores therethrough, and bodies of a graphitic lubricating material mechanically held within said pores and substantially completely filling the same.

6. A sintered porous copper nickel alloy element having a completely sponge-like physical structure, said element being made from non-compacted metal powder and comprising minute intercommunicating pores therethrough, and bodies of a graphitic lubricating material mechanically held within said pores and substantially completely filling the same.

7. A sintered porous iron alloy element having a completely sponge-like physical structure, said element being made from non-compacted metal powder and comprising minute intercommunicating pores therethrough, and bodies of a graphitic lubricating material mechanically held within said pores and substantially completely filling the same.

8. A sintered porous metal bearing element having a completely sponge-like physical structure, comprising minute intercommunicating pores therein, and bodies of a solid lubricant material substantially filling said pores, the surface pores of said element having their outer entries mechanically reduced in size for holding said lubricant therein.

9. The method of forming the porous metal element having the pores thereof substantially filled with a solid lubricant material, including the steps of, distributing a uniform layer of un-compacted powdered metal upon a supporting surface, sintering the powdered metal layer under non-oxidizing conditions to form a strong highly porous metal layer, and subsequently impregnating the porous metal layer with a solid lubricant material.

10. The method of forming the porous metal element having the pores thereof substantially filled with a solid lubricant material, including the steps of, distributing a uniform layer of un-compacted powdered metal upon a supporting surface, sintering the powdered metal layer under non-oxidizing conditions to form a strong highly porous metal layer, subsequently impregnating the porous metal layer with a solid lubricant material and then rolling the porous metal layer between pressure rolls for reducing the size of the surface entries of the pores and thereby mechanically holding the lubricant within the pores.

11. The method of forming a composite metal element including a porous metal layer having the pores thereof substantially filled with a lubricant material, comprising the steps of, distributing a uniform layer of uncompacted powdered metal upon a metal surface having a higher melting point than the metal powder, sintering the powdered metal layer upon the metal surface under non-oxidizing conditions to form a strong highly porous metal layer which is bonded by an alloy bond to said metal surface, and subsequently impregnating the porous metal layer with a solid lubricant material.

12. The method of forming a composite metal bearing element including a porous metal layer having the pores thereof substantially filled with a lubricant material, comprising the steps of, distributing a uniform layer of uncompacted powdered metal upon a metal surface having a higher melting point than the metal powder, sintering the powdered metal layer upon the metal surface under non-oxidizing conditions to form a strong highly porous metal layer which is bonded by an alloy bond to said metal surface, subsequently impregnating the porous metal layer with a solid lubricant material, and then passing the impregnated composite element between pressure rolls for reducing the size of the surface entries of the pores of the porous metal layer and thereby mechanically holding the lubricant within the pores.

13. The method of forming the porous metal bearing element having the pores thereof substantially filled with graphite material, comprising the steps of, distributing the uniform layer of uncompacted powdered metal upon a supporting surface, sintering the powdered metal layer under non-oxidizing conditions to form a strong highly porous metal layer, immersing said porous metal layer in a hot fluid compound including graphite and a binder, which compound is solid at room temperature, and thereby impregnating the pores of the porous metal layer with the graphitic material, and then cooling the impregnated porous metal element.

14. The method of forming the porous metal bearing element having the pores thereof substantially filled with graphitic material, comprising the steps of, distributing the uniform layer of uncompacted powdered metal upon a supporting surface, sintering the powdered metal layer under non-oxidizing conditions to form a strong highly porous metal layer immersing said porous metal layer in a hot fluid compound including graphite and a binder which compound is solid at room temperature, and thereby impregnating the pores of the porous metal layer with the graphitic material, cooling the impregnated porous metal element, and then compacting the impregnated porous metal element for reducing the size of the entries of the surface pores and thereby mechanically holding the lubricant within the pores.

ROLAND P. KOEHRING.